July 5, 1949.                S. M. SMITH                2,475,207
                       TRANSPARENT BIRD FEEDER
                         Filed May 22, 1945
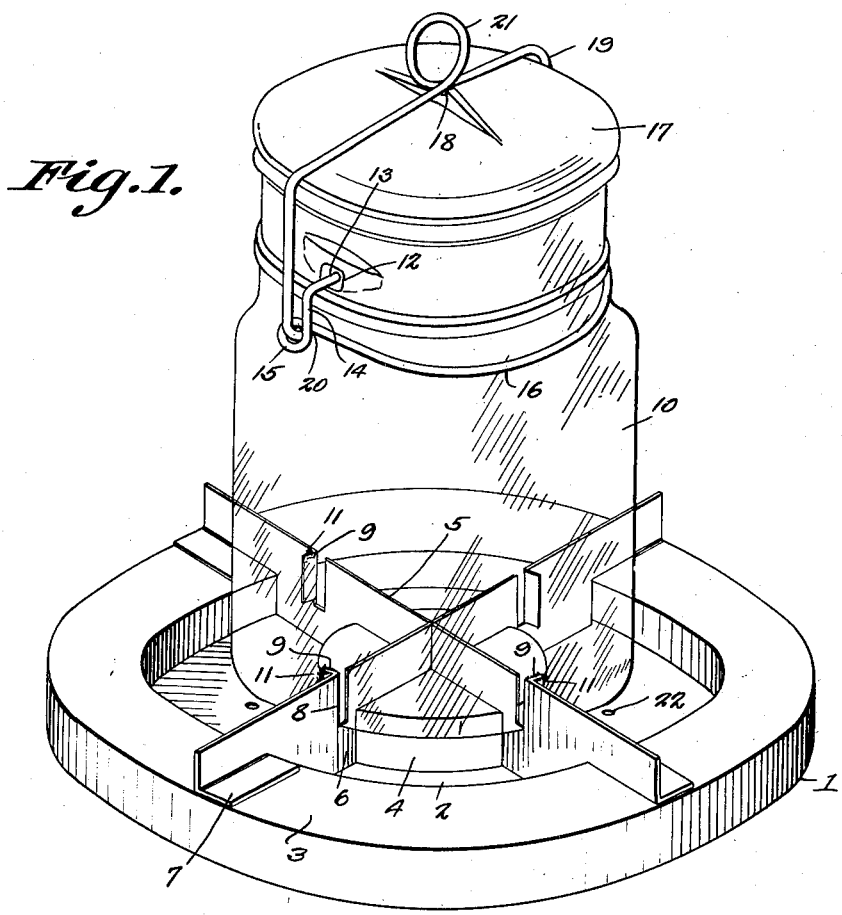
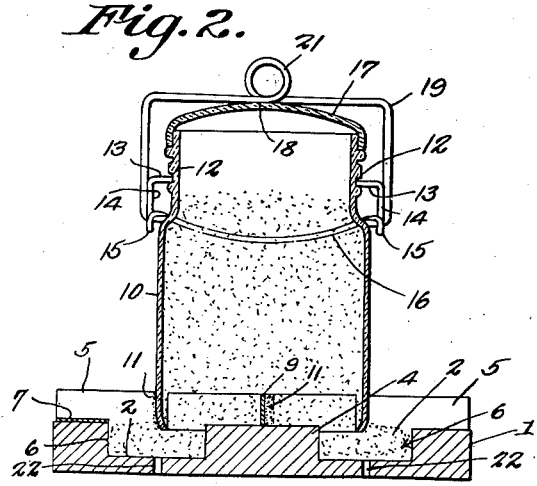
S. M. Smith
INVENTOR.
BY *[signature]*
ATTORNEYS.

Patented July 5, 1949

2,475,207

UNITED STATES PATENT OFFICE 2,475,207

TRANSPARENT BIRD FEEDER

Samuel M. Smith, New Bedford, Mass.

Application May 22, 1945, Serial No. 595,123

2 Claims. (Cl. 119—52)

This invention relates to bird feeders of a type adapted to be suspended from a suitable support and so constructed as to contain a quantity of feed where it will be fully protected from the weather and from which the feed can gravitate for the purpose of maintaining a portion of the material constantly where it can be reached readily by birds.

A further object is to provide a bird feeder having a base in which is formed a trough, there being means interposed between this base and a magazine, whereby material gravitating from the magazine will be divided into separate bulks accessible to the birds.

A still further object is to provide a bird feeder having a sealing cover which can be removed readily but which, when in position, is held securely, the fastening means serving also as a support-engaging element and being so designed as to be held against displacement accidentally while the feeder is in use.

A still further object is to provide a bird feeder formed of a transparent material whereby the contents of the magazine are visible at all times to the birds which are attracted thereby.

Another object is to provide a base for the feeder which serves as a perch on which the birds can be supported while feeding.

Another object is to provide a bird feeder which is inexpensive to manufacture, can be sold at low cost, and constitutes not only an efficient feeder but also presents an attractive appearance.

A still further object is to provide a means for protecting the feed from air currents which otherwise might blow the seeds from the feeder.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a perspective view of the feeder.

Figure 2 is a central vertical section therethrough on a reduced scale.

Referring to the figures by characters of reference, 1 designates a base which is preferably circular and can be made of wood or any other suitable material. Formed in the top of this base is a recess or trough 2 preferably concentric with the base and widely spaced from the margin thereof so as to form a wide outer flange constituting a perch 3 on which birds may alight. A central raised portion 4 is surrounded by the trough and is bridged by crossed partition strips 5 which are extended outwardly to the margin of the base and cooperate to divide the base into separate segments, as shown. These strips are provided with depending portions 6 which extend into the trough 2 and are adapted to divide it into separate compartments as shown. Those portions of the strips 5 which are extended over the base between trough 2 and the outer margin of the base, can be formed with attaching flanges 7 secured in any suitable manner to the base.

Each of the partitions strips 5 is provided, at a point above the trough 2, with a slot 8 extending downwardly into the strip to a point at or below the level of the top surface of the base 1. Metal displaced in the formation of the slots can be offset to form flanges 9 adapted to bear against the outer surface of the open lower end of a magazine 10 and to be secured to said surface by means of a cement 11 capable of resisting the action of moisture and temperature changes. The lower open end of the magazine 10 is concentric with the base and is seated on the lower end walls of the slots 8. The upper end of this magazine can be formed with recessed ears 12 diametrically opposed and positioned to receive the inturned ends 13 of fingers 14 extending upwardly from loops 15 provided by twisting portions of a yoke 16. This yoke straddles the magazine and when in its lowermost position, holds the loops 15 below the level of the inturned ends 13 which are alined.

The upper end of the magazine 10 is closed by cover 17 having a notched rib 18. A clamping yoke 19 formed of strong resilient wire straddles the cover and the upper end of the magazine and has inturned terminal fingers 20 extending through the loops 15. That portion of the yoke 19 above the rib is bent to provide a support-engaging loop or eye 21.

The entire magazine and its cover, which can approximate in appearance a preserving jar, can be made of any suitable transparent material such as glass, plastic, etc. The cover 17 is removed by lifting the yoke 16 so as to allow the loops 15 to swing upwardly, thereby disengaging the yoke 19 from the cover. The magazine is partly or entirely filled with the seeds or other granular material to be fed to the birds and the cover is then replaced and fastened so that moisture falling on the cover cannot flow into the magazine. The material in the magazine will gravitate into position on the raised portion 4 and between the partition strips 5 and will then flow radially into those portions of the trough 2 between the partitions. The seeds or the like in this trough are thus made accessible to birds alighting on the perch or annular portion 3 of the base. As the partition strips are extended well above the surface of the base and as the lower edge of the magazine is extended to or slightly below the level of the top of the base, it will be obvious that these parts will act as windshields so that air currents flowing against and past the feeder will not blow the seeds out of the trough. Any moisture which might enter the trough can drain through openings 22 provided for that purpose in the base 1.

As before explained, the loop or eye 21 can engage a suitable support so that the entire feeder can thus be suspended in the air if desired. While being suspended the yoke 19 cannot become displaced relative to the magazine and, therefore, there is no danger of the cover 17 being displaced accidentally.

What is claimed is:

1. A bird feeder including a flat circular base having a circular trough formed therein defining a central raised portion, and a relatively wide outer flange, diametrically disposed crossed partition strips mounted on and secured to the base, each of said strips being extended across the base, having its ends flush with the peripheral edge of the base, and having a portion extending into the trough, the strips being substantially greater in height than the outer flange and central raised portion, there being slots extended downwardly into those portions of the partition strips within the trough, a transparent magazine having an open bottom extending into the slots and supported by the partition strips out of contact with but concentric to the trough, means for securing the magazine to the partition strips, and a closure mounted on the magazine.

2. A bird feeder including a relatively thick circular base formed with a flat upper surface having a circular trough therein defining a flat central raised portion, and a wide flat outer flange of equal height with the central raised portion diametrically disposed crossed partition strips mounted on and secured to the base, each of said strips having a portion extending into the trough and being extended across the base in bridging relation relative to the outer flange and central raised portion, there being slots extended downwardly into those portions of the partition strips within the trough, a transparent magazine having an open bottom extending into the slots and supported by the partition strips out of contact with but concentric to the trough, the bottom edge of the container being extended below the level of the upper surfaces of the outer flange and central raised portion, means for securing the magazine to the partition strips, a closure removably mounted on the magazine, and means cooperating with the magazine and closure for binding the closure in shut position, said means including a support-engaging element.

SAMUEL M. SMITH.

REFERENCES CITED

The following references are of record in the file of this patent:

UNITED STATES PATENTS

| Number | Name | Date |
|---|---|---|
| 232,124 | Hatfield | Sept. 14, 1880 |
| 437,952 | Ward | Oct. 7, 1890 |
| 503,664 | Jones | Aug. 22, 1893 |
| 1,005,071 | Randall | Oct. 3, 1911 |
| 1,058,796 | Schott | Apr. 15, 1913 |
| 1,067,824 | Leichtfuss | July 22, 1913 |
| 2,324,020 | Pinson | July 13, 1943 |